United States Patent [19]

Sato et al.

[11] Patent Number: 4,734,710
[45] Date of Patent: Mar. 29, 1988

[54] THERMAL LABEL PRINTER

[75] Inventors: Yo Sato, Tokyo; Tadao Kashiwaba, Iwate, both of Japan

[73] Assignee: Kabushiki Kaisha Sato, Japan

[21] Appl. No.: 853,681

[22] Filed: Apr. 18, 1986

[30] Foreign Application Priority Data

Apr. 26, 1985 [JP] Japan .................................. 60-89001
Apr. 26, 1985 [JP] Japan .................................. 60-89002
Apr. 26, 1985 [JP] Japan .................................. 60-89003

[51] Int. Cl.⁴ .......................... G01D 15/10; B65C 9/18;
B41J 3/20; G06K 19/00
[52] U.S. Cl. ................................ 346/76 PH; 101/66;
101/93.04; 101/288; 156/384; 156/577;
156/579; 156/DIG. 47; 156/DIG. 49;
156/DIG. 51; 235/385; 235/432; 235/487;
235/488; 400/73; 400/103; 400/120; 400/611;
346/136

[58] Field of Search .......................... 346/76 PH, 136;
101/93.04, 93.05, 288, 291, 292, 66; 156/384,
570, 577, 579, 584, DIG. 47, DIG. 48, DIG. 49;
235/383, 385, 378, 432, 472, 487, 488, 494;
400/120, 611, 73, 103

[56] References Cited

U.S. PATENT DOCUMENTS 4,268,179 5/1981 Long et al. ........................ 400/120
4,415,065 11/1983 Sandstedt ............................. 186/39
4,555,715 11/1985 Vegeais et al. ................ 346/76 PH
4,611,246 9/1986 Nihei ................................... 358/256

Primary Examiner—E. A. Goldberg
Assistant Examiner—Gerald E. Preston
Attorney, Agent, or Firm—Ostrolenk, Faber, Gerb & Soffen

[57] ABSTRACT

A portable label printer comprising a label printer unit and an electrically and mechanically detachable data terminal unit is disclosed. When mated, the data terminal unit and the label printer unit are angularly adjustable with respect to each other. The printer unit has an interface for communication with external devices.

21 Claims, 7 Drawing Figures

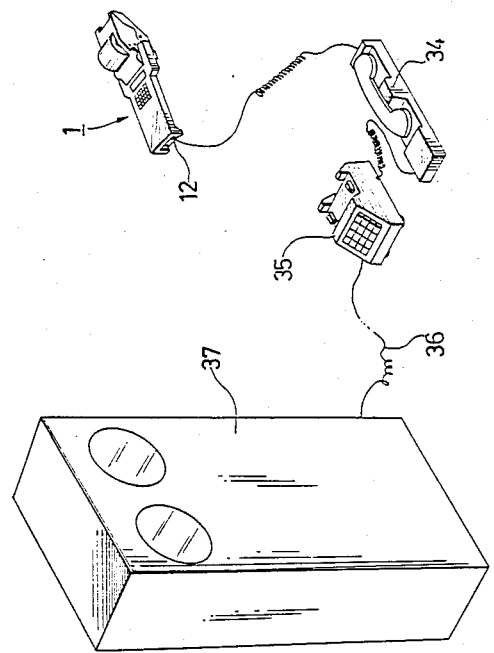
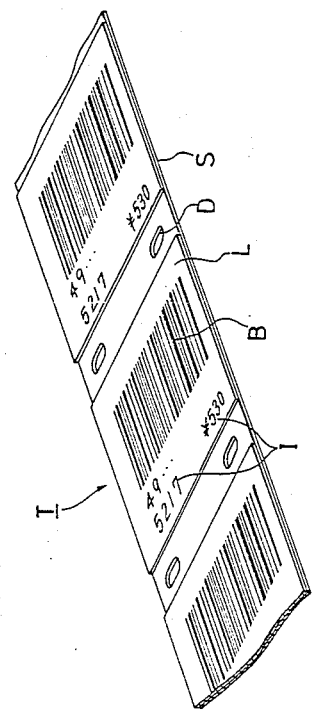
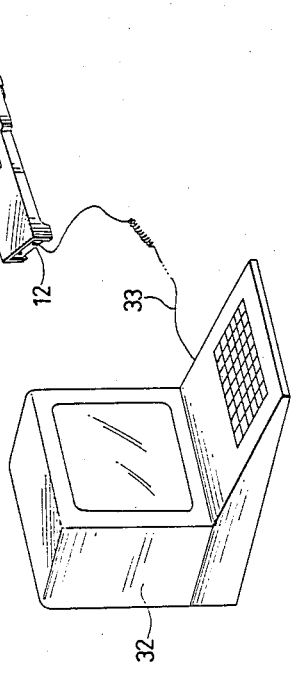
FIG. 3
FIG. 4
FIG. 5

THERMAL LABEL PRINTER

BACKGROUND OF THE INVENTION

This invention relates, to a thermal label printer capable of receiving from, and transmitting to an external device. More particularly, a thermal label printer having an interface for communication with external devices and for printing labels is taught. Further, a label printer portion may be detached from a data terminal portion. Also, the label printer portion and the terminal portion when mated are angularly adjustable with respect to each other.

Various types of portable data collectors, data terminals and the like have been developed. These devices use a data reader, such as a pen scanner, to scan bar codes or the like. The collector temporarily stores the data read by the data reader. This stored data is supplied to a small printer which prints on ordinary paper for confirmation or later reference. The stored data may also be supplied to a host computer or the like for various types of data processing.

These conventional collectors are disadvantageous in that they are only capable of printing out data on ordinary paper for the purpose of confirmation or future reference. They therefore have only limited applications since they are not capable of reproducing the data for display on articles of merchandise or the like.

Another drawback of conventional data collectors is that in applications that require data input and label printing operation at different places, the printer section of the device interferes with the data input operation. More specifically, data collectors of this type are commonly used as data terminals which are taken out of the office into the warehouse or out into the field. They therefore have to be ruggedly constructed in order to withstand dropping, extreme temperatures and high humidity and are therefore invariably heavy for their size. Thus, when the collector is to be used only for data input, and not for simultaneous printout, the need to carry around a heavy printer section hinders the operator's work.

Conventional data collectors also have an economic disadvantage where it is necessary to print out labels of different sizes (especially of different widths). Since printing of different size labels necessitates the use of different print heads and other mechanical elements, it is necessary for the user to purchase two or more different types of thermal label printers.

Another disadvantage in conventional devices is that they cannot be angularly adjusted. This is important where, in one mode data is being inputted through the keyboard, and in another mode labels are being applied to merchandise or other objects. This is particularly so where a label printer is used both as a desktop device in an office and as a portable device to be taken out of the office into the warehouse or out in the field. As a result, the conventional devices have often been inconvenient for the operator to use.

SUMMARY OF THE INVENTION

Accordingly, it is an object of the present invention to provide a thermal label printer which is capable of receiving and processing inputted data with an interface for transmitting received or processed data to a host computer or other external device.

It is another object of the present invention to provide a thermal label printer which is capable of printing data on thermal labels for affixing to articles of merchandise and the like, or to files.

It is a further object of the present invention to provide a thermal label printer which is well adapted for use in applications where data input and label printing are carried out at different locations or where labels of different sizes may be printed.

It is an other object of the present invention to produce a portable device for tracking and marking packages or the like and having information thereon which uses a printing medium in conjunction with a printing unit for printing on the printing medium. A data terminal includes a first input device for receiving the information contained on the package, memory for storing therein the information contained in the package and for storing therein predetermined package information. A controller is connected to the printing unit, the first input device and memory for controlling the printing unit and the memory. A means is provided for connecting the printing unit to the data terminal unit in adjustable angular relationship thereto. Another means is provided for making the printing unit and the data terminal unit readily detachable from each other. Also interface is used for communication with an external computer.

The present invention attains these objects by providing a thermal label printer comprising a data input means such as a pen scanner or keyboard, a data memory means for storing the data from the data input means, a data transmission means for transmitting data to a microcomputer or a host computer, and a printer means for printing required data on thermosensitive labels.

These labels are separable for attachment to prescribed articles or at prescribed places. Further, the thermal label printer is divided into a label printer unit which is detachable from a data terminal unit. Therefore, the thermal label printer according to the present invention may be applied to uses not possible of previous data collectors.

The thermal label printer according to this invention is thus not only able to receive and output data, but also to print labels. As a result of printing required data on labels, it becomes possible to indicate the data on articles of merchandise and the like or on files therefor, to display the data at a later time, or to use the data for data administration at a later time. Moreover, in cases where data input and data output operation are carried out at different places, the efficiency of the data input operation may be improved by disconnecting the terminal unit from the printer unit. Also, by providing a plurality of printer units each adapted for printing labels of a different size, it becomes possible to print labels of the desired size simply by selecting an appropriate printer unit and connecting it with the terminal unit.

Further, the capability of the thermal label printer can be further expanded by the use of function keys for entering commands for different data input and output modes. Also, the angular relation between the terminal unit and the printer unit may be adjusted. Therefore the angle of inclination of the thermal label printer may be varied to obtain optimum operability and utility when it is used as a desktop device as well as when it is used as a portable device.

BRIEF DESCRIPTION OF THE DRAWINGS

FIG. 3 is a perspective view of a segment of a label strip;

FIG. 4 is a perspective view showing how the thermal label printer according to the present invention is connected to a microcomputer;

FIG. 5 is a view showing how the thermal printer is connected to a host computer;

DESCRIPTION OF THE PREFERRED EMBODIMENT

Figure 1:
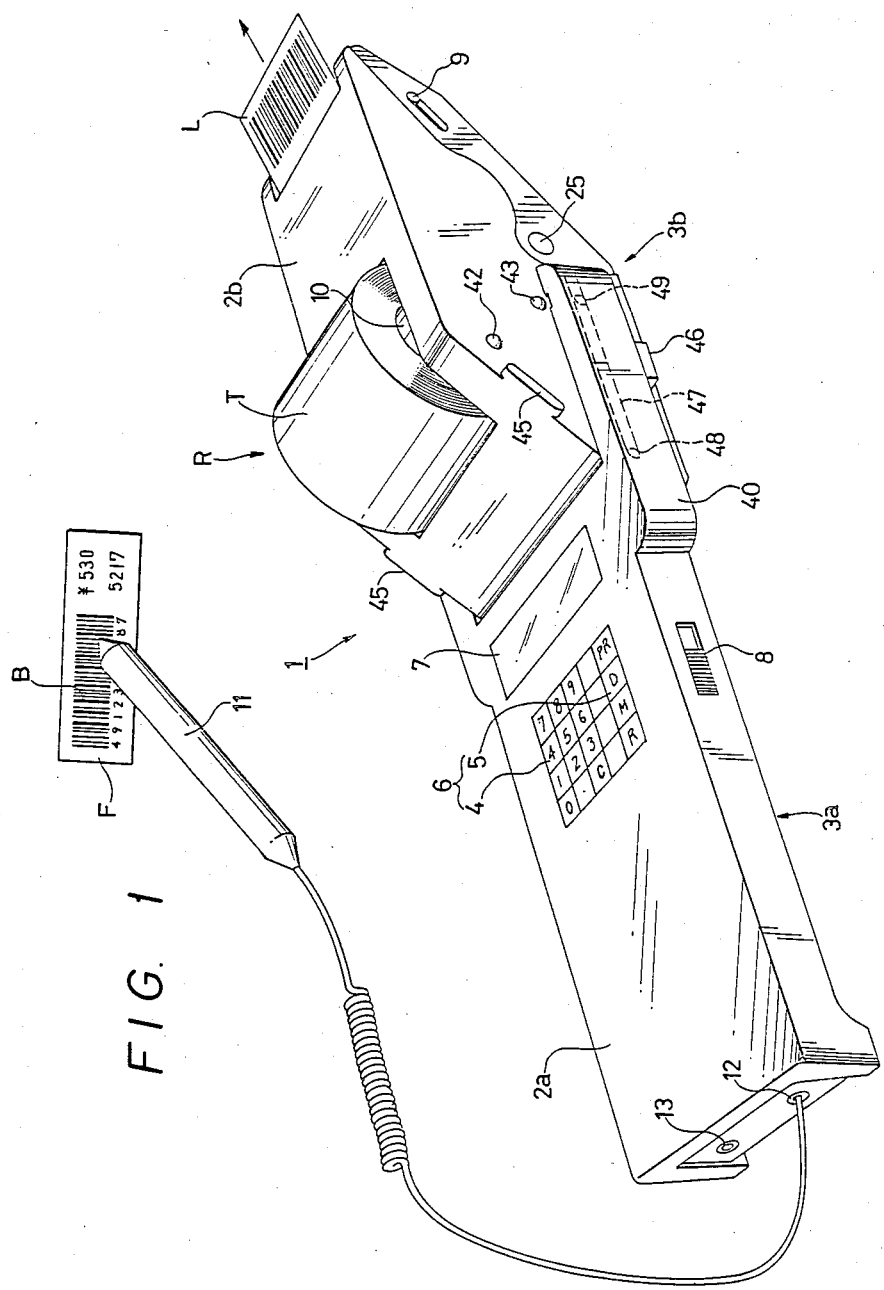
FIG. 1 is a perspective view of an embodiment of the thermal label printer of the present invention.

The thermal label printer 1 shown in FIG. 1 comprises of a data terminal unit 2a and a label printer unit 2b which combine to form a main or desktop type unit 1. The units 2a and 2b have respective flat bottom surfaces 3a and 3b which can be used for supporting the thermal label printer on any desired flat surface.

Figure 6:
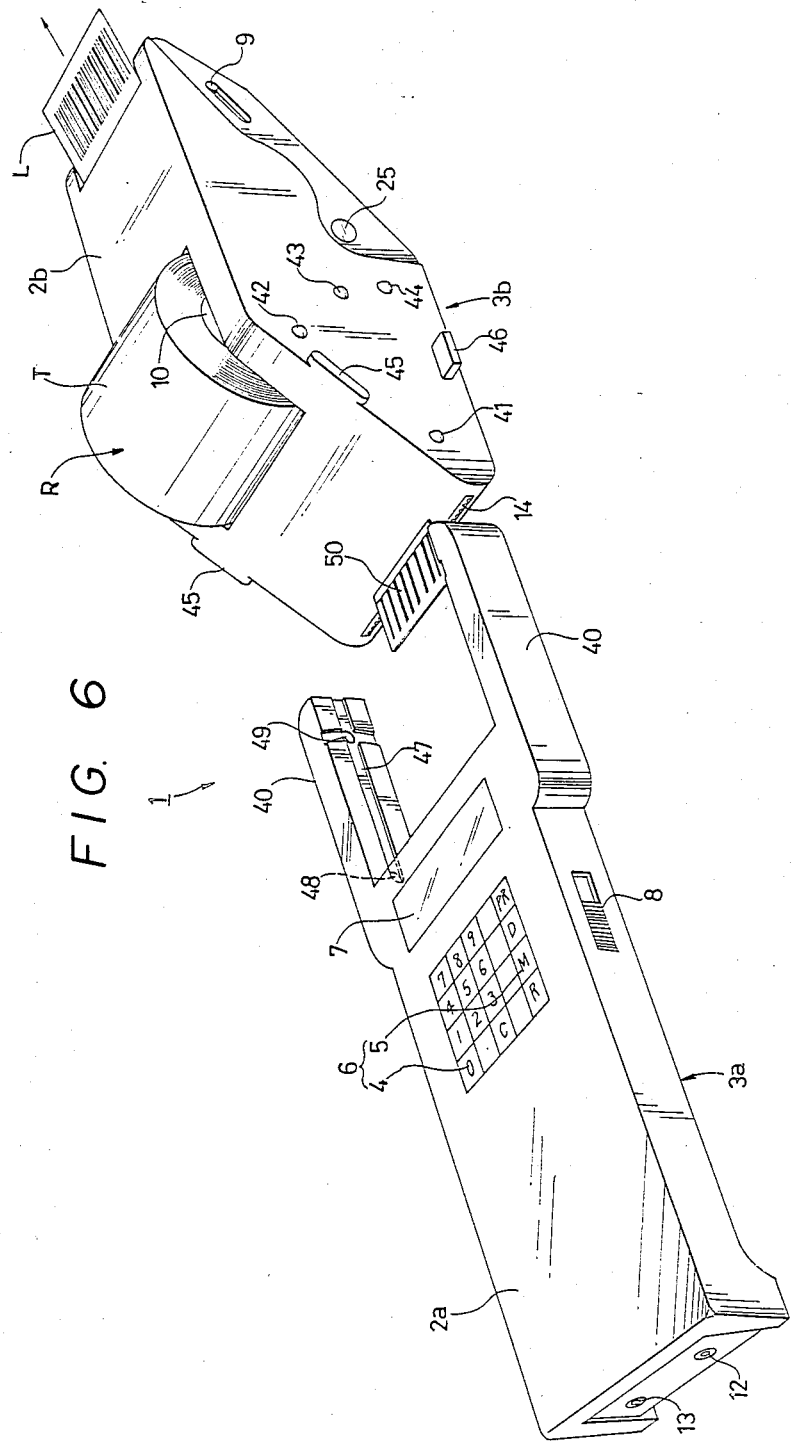
FIG. 6 is a perspective view of a thermal label printer with the data terminal unit separated from the label printer unit.

Data terminal unit 2a is provided on its top side with a keyboard 6. The keyboard 6 consists of a numeric pad 4 and a number of function keys 5. Above the keyboard 6 is a data display 7 which may, for example, be a liquid crystal display. One side surface of the data terminal unit 2a is provided with a power switch 8. The printer unit 2b is provided on either side with an open/close button 9 (only one shown). A support member 10 is used for holding a thermal label roll R consisting of a thermal label strip T wound into a roll. The thermal label strip T comprises a backing sheet S (FIG. 2) bearing numerous labels. After being printed and detached from the backing sheet S, the labels are discharged from the front end of the thermal label printer 1 as indicated by the arrow. A discharge outlet 14 (FIGS. 2 and 6) is used for the backing sheet S which is formed at the rear end of the printer unit 2b.

Figure 2:
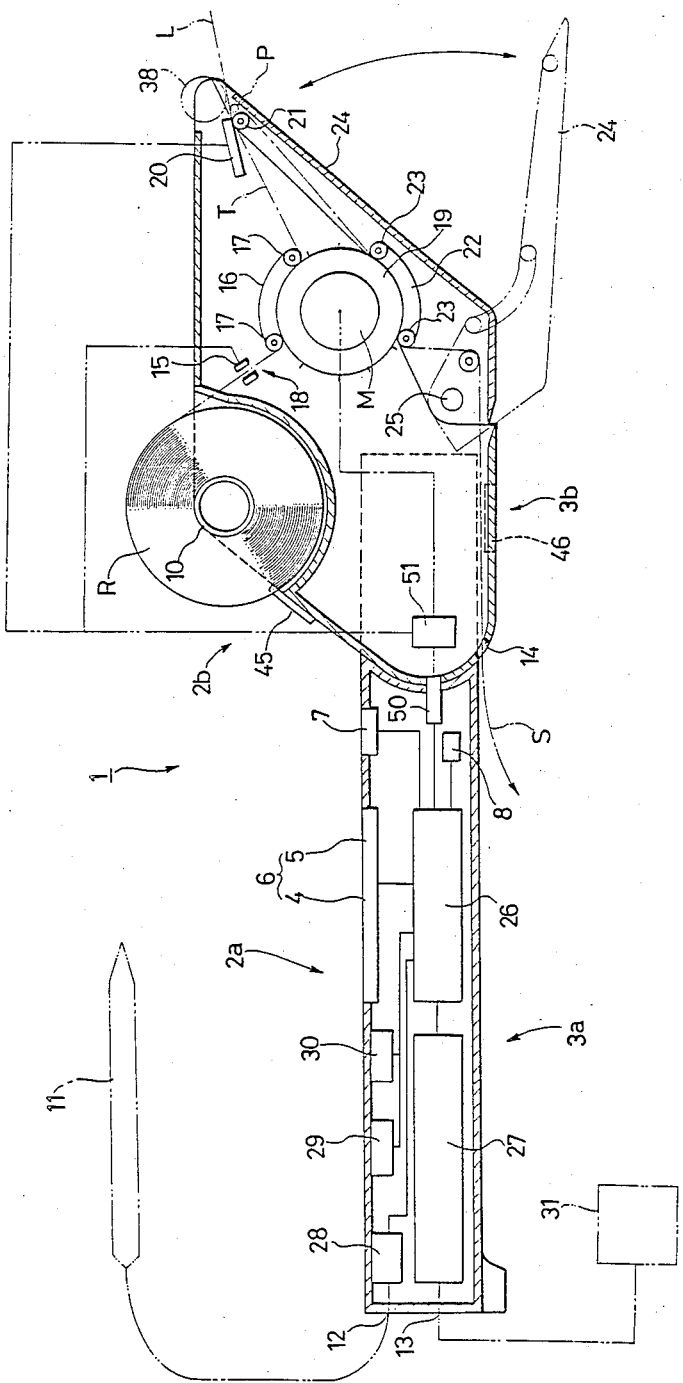
FIG. 2 is a sectional view of FIG. 1.

At the rear end of the terminal unit 2a there is provided a socket 12 for connecting a pen scanner 11. A socket 13 is used to connect a battery charger 31 to an internal battery 27 (FIG. 2).

The pen scanner 11 is passed over a bar code B which is printed on a shelf tag F. The code represents a merchandise code or the like. The bar code data is inputted in this form to the thermal label printer 1.

The terminal unit 2a and the printer unit 2b are shown detached from each other in FIG. 76. A yoke 40 is provided on the forward end of the terminal unit 2a for holding the two units 2a, 2b together and they can therefore be connected and disconnected as desired.

Printer unit 2b has a pair of steel balls 41 (only one shown) which are countersunk at symmetrical positions in the left and right side surfaces. Symmetrically disposed steel balls 42, 43 and 44 (only one of each pair shown) are provided for adjusting the angular position therebetween the terminal unit 2a and the printer unit 2b. A pair of upper position stops 45 and a pair of lower position stops 46 are used to define the upper and lower limits of angular travel of the printer unit 2b. The steel balls 41, 42, 43 and 44 are outwardly urged by associated springs (not shown) and normally protrude above the side surface of the unit 2b while to receding under externally applied pressure to a position which is substantially flush with the associated side surface.

The yoke 40 has a guide groove 47 running along the inside surface of either leg. Each guide groove 47 is provided with a pivot hole 41 and an angular position fixing hole 49. When the units 2a, 2b are connected, steel balls 41 pass along groove 47 until they snap into engagement with pivot holes 48. At that time, depending upon the orientation of the printing unit, one pair of steel balls 42, 43, 44 will snap into engagement with the angular position fixing holes 49. The angular relation between the units 2a and 2b where the yoke 40 is in abutment with the lower position fixing holes 49 is shown in FIG. 1.

Figure 7:
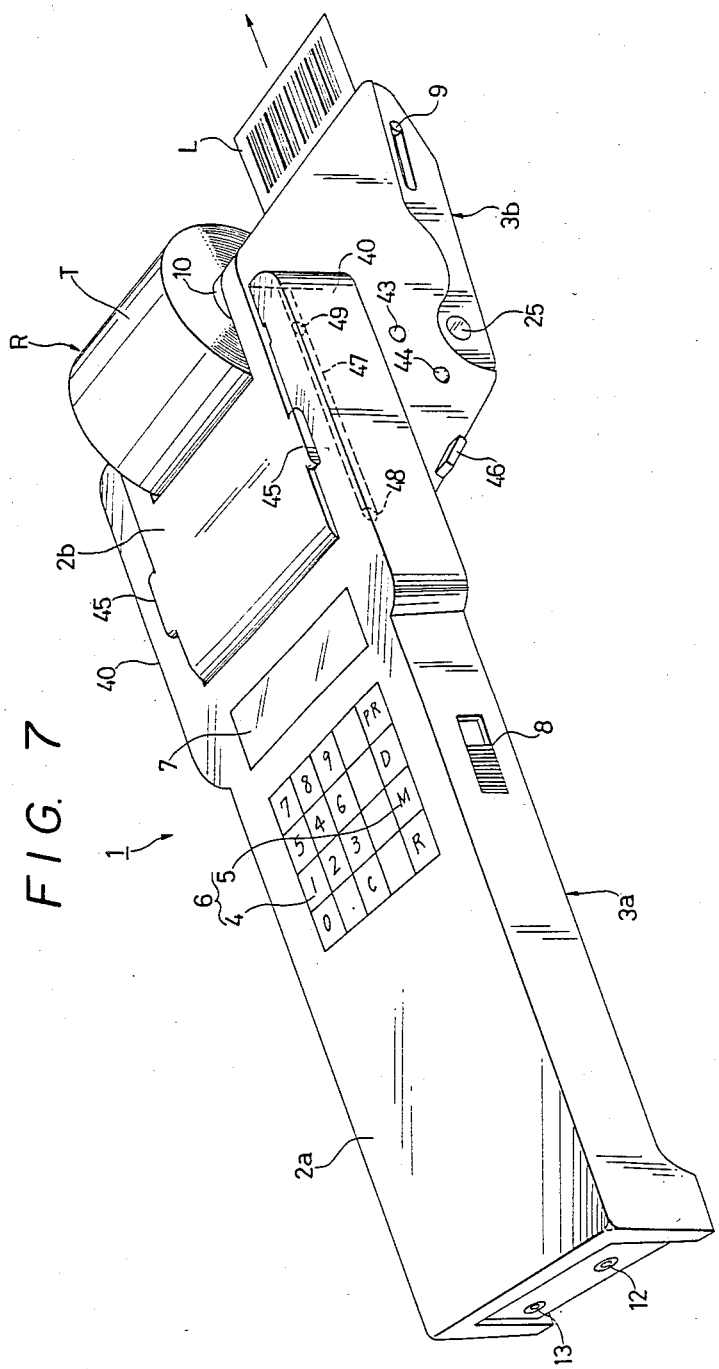
FIG. 7 is a perspective view of the thermal label printer shown in FIG. 1 with the data terminal unit and the label printer unit connected at an angle.

FIG. 7 shows where the angular relation between the units 2a and 2b is such that the yoke 40 is in abutment with the upper position stops 45 when the steel balls 42 are engaged in the angular position fixing holes 49. A connector 50 is provided for electrical connection between units 2a, 2b.

It is to be understood that the mechanism for mechanically connecting the units 2a and 2b in angular relationship may be accomplished in many ways without departing from the spirit and scope of the present invention. For example, screws, cams, leaf springs, linkages and the like may be used. Further, it is not required that the units 2a, 2b be detachable. For example, units 2a and 2b may be connected by replacing the steel balls 41 and the pivot holes 48 with pivot bosses and tapped holes (neither shown), respectively, and using bolts to fix the two units together.

The thermal label strip T (FIG. 3) as used in the present invention consists of a continuous series of labels L detachably adhered to a continuous backing sheet S. The labels L have adhesive applied to their rear surfaces while the backing sheet S is coated with a parting agent to facilitate separation of the labels L therefrom. The labels L are intended to be printed with information I and may include a bar code B which represents a merchandise code or a manufacturer code, or a division code or a price. The backing sheet S has holes D for strip T position detection as well as for engagement with the conveyor roller 19 (FIG. 2).

The internal structure of the thermal printer 1 may be seen by referring to FIG. 2. The thermal label strip T is drawn off the thermal label roll supported on the support member 10 of the label printer unit 2b. The strip T is passed along a label strip passage 18 and passes through position sensor 14 and along the guide rollers 17 of an upper press member 16.

The thermal label strip T passes via the conveyor roller 19 to a thermal print head 20 and a platen 21. The strip T is redirected at the platen 21. There the labels L are peeled off, so that just the backing strip is directed for engagement with the conveyor roller 19. The backing is then guided by guide rollers 23 of lower press member 22. The backing sheet S then feeds out from the unit 2b via discharge outlet 14. A sheet bending pin P (shown in phantom) may be provided in front of the platen 21 as the label peeling means for peeling the labels L from the backing sheet S as the backing sheet S is redirected.

The loading of the label strip T is accomplished by moving the open/close buttons 9 and allowing the bottom cover 23 to swing downwardly about pivot 25 as shown in phantom. This makes it possible to insert a roll of thermal label strip T therein. The bottom cover 24 is coupled to platen 21 and to the lower press member 22 and therefore also swings downwardly. Any conventional type opening/closing mechanism 9 may be used for this purpose, details thereof are not provided. The conveyor roller 19 is driven by the stepped rotation action of stepping motor M and moves and thermal label strip T in the required direction for printing and conveyance.

The control circuit 26, which is housed in terminal unit 2a, is connected to battery 27, an interface 28 for data input from and output to external devices, a ROM program memory 29 for communication and control programs, a RAM data memory 30, and a keyboard 6. The display 7, sensor 15, thermal print head 20 and stepping motor M and interface 51 are also connected to the control circuit 26 via connector 50 and are therefore controlled by control circuit 26. The interface 51 allows communication with external devices. The battery 27 is preferably a rechargeable type and can be connected via socket 13 to an external battery charger 31.

FIG. 4 shows the thermal label printer 1 connected to a microcomputer 32 thereby allowing I/O data operations therebetween. This data may be transferred to microcomputer 32 via socket 12 by use of a cable 33. Alternately, an acoustic coupler 34 (FIG. 5) may be used to link the printer 1 to a large host computer 37 via a telephone 35, and any suitable wired or wireless link.

The operation of the present invention will now be described with reference to an application for replenishing stock at a supermarket or the like.

Accordingly, an operator carries the thermal label printer 1 and the pen scanner 11 to a merchandise display shelf. The operator scans a shelf tag F, thus inputting the merchandise code and other pertinent data to the thermal label printer 1. The keys of the numeric pad 4 are then used to input the quantity of merchandise to be ordered to bring the stock up to the desired level. This inputted data is displayed on the display 7 so that the operator is able to confirm its accuracy. The operator then repeats the process moving to succeeding shelves or racks. During the course of work, the operator may or may not want to immediately print labels using the inputted data. Therefore, if there is no need to immediately print labels, the operator may simply detach the printer unit 2b and carry only the terminal unit 2a. This will reduce the weight of the equipment which is to be carried and therefore result in a lower amount of required labor. This is typically the case where a large store is involved.

The inputted data is temporarily stored in the data memory 30. After the work of inputting the data for stock replenishment has been completed, it may then be transmitted from the thermal label printer 1 to a microcomputer 32 or a host computer 37. The transmission of data from the thermal label printer 1 to the microcomputer 32 or the host computer 37 preferably does not erase it from the data memory 30. Upon arrival of the ordered merchandise, it is then possible for the user to go to a more convenient location such as the freight receiving area, reconnect terminal 2a with printer unit 2b and print the required labels. In order to print the labels in this fashion, the user need only press the function key 5 marked PR. This will cause the conveyor roller 19 to advance the thermal label strip T and activate the thermal print head 20. This will then print the labels L with bar codes B or any other information I corresponding to the merchandise codes which have been stored in memory 30 as described.

Since only the backing sheet S is redirected at the platen 21, the labels L may be peeled off as each is ejected from unit 2b. As each label is ejected, the user takes the label L and affixes it to the appropriate item of merchandise (not shown).

Thus the labels may be printed merely by use of a function key, without the troublesome work of manually inputting the merchandise code and quantity data as has conventionally been required.

When a large number of labels is to be applied to merchandise, an application roller 38 forward of the platen 21 may be used. In this case, the work of applying the labels can be carried out with high efficiency by adjusting the angular relation between the units 2a and 2b as shown in FIG. 7, and using the terminal unit 2a as a handle.

It is to be noted that the structure of the thermal label printer may be simplified, if desired, by omitting the keyboard and providing only the pen scanner 11 or a touch scanner as the data input means. Also, the display may be omitted or another input socket 12 may be provided. Further, where it is desired to make the thermal label printer more easily portable, a handle (not shown) may be provided on the bottom of one of the two units 2a and 2b. This handle may be of either fixed, detachable or a foldable type.

Although the invention has been described with respect to an application for ordering merchandise to replenish stock at a supermarket or the like, this usage is exemplary only. Other means for inputting and outputting of data may be used. As a result, the thermal label printer according to this invention is able to print labels based on various data from various sources, and is therefore applicable to a wide range of uses, many of which could not be handled by conventional label printers.

These uses may include, for example, stock administration at retail shops, office data file administration, printing of blood data cards, test tube labels at blood banks, printing of bar code labels for patient charts, medical certificates at medical clinics and hospitals, administration of manufacturing processes, parts and inventory control at factories, printing of labels for confirmation of freight shipment, administration of data, printing of labels relating to outside suppliers at department stores or supermarkets, and administration of customer data at department stores and supermarkets.

Although the present invention has been described in connection with a preferred embodiment thereof, many other variations and modifications will now become apparent to those skilled in the art. It is preferred, therefore, that the present invention be limited not by the specific disclosure herein, but only by the appended claims.

What is claimed is:

1. A portable device for tracking and marking packages or the like having information thereon, comprising:
   a separate printing unit means for printing on a print medium;
   a separate data terminal means, including:
      a first input means for detecting and receiving said information contained on said packages;
      memory means for storing therein said information contained on said package and also for storing therein other predetermined package information;

control means connected to said printing unit means, said first input means and said memory means, for receiving said information from said first input means and for transferring said information to said memory means, for developing data, based on said predetermined package information and said information contained on said packages, which data is to be printed on said print medium, and for controlling said printing unit means and said memory means to cause said data to be printed, by said printing unit means, on said print medium; and means for connecting said printing unit means to said data terminal unit means, said connecting means being effective to provide adjustable angular orientation between said printing unit means and said data terminal means, said connecting means being effective to enable said printing unit means to carry out its printing function regardless of the angular orientation between said printing unit means and said data terminal unit means.

2. A portable device for tracking and marking packages or the like according to claim 1, wherein said printing unit means and said data terminal unit means are readily detachable from each other.

3. A portable device for tracking and marking packages or the like according to claim 1, wherein said printing means is comprised of a thermal printer.

4. A portable device for tracking and marking packages or the like according to claim 1, wherein said first input means is comprised of a keyboard.

5. A portable device for tracking and marking packages or the like according to claim 1, wherein said first input means is comprised of a pen scanner.

6. A portable device for tracking and marking packages or the like according to claim 1, wherein said information contained on said packages is in the form of a bar code.

7. A portable device for tracking and marking packages or the like according to claim 1, wherein said print medium is comprised of a label.

8. A portable device for tracking and marking packages or the like according to claim 1, further comprising an I/O port means connected to said control means for communication with an external computer.

9. A portable device for tracking and marking packages or the like according to claim 1, further comprising alignment holes disposed at predetermined positions in said print medium and further comprising a print medium position detector means adjacent said alignment holes for registering the relative position of said print medium in said printing unit means.

10. A portable device for tracking and marking packages or the like according to claim 9, further comprising a print medium passage in said device and a print medium transport means connected to said print medium and to said control means, said transport means moving said print medium in response to printing by said printing unit means on said print medium, said print medium disposed in said print medium passage.

11. A portable device for tracking and marking packages or the like and having information thereon, comprising:
a separate printing unit means for printing on a print medium;
a separate data terminal unit means, including:
first input means for detecting and receiving said informaton contained on said packages;
memory means for storing therein said information contained on said package and for storing therein predetermined package information;

control means connected to said printing means, said first input means and said memory means, for receiving said information from said first input means and for transferring said information to said memory means, for developing data, based on said predetermined package information and said information contained on said packages, which data is to be printed on said print medium, and for controlling said printing unit means and said memory means to cause said data to be printed, by said printing unit means, on said print medium; and means for freely connecting and disconnecting said printing unit means and said data terminal unit means, said connecting means being effective to enable connection of said printing unit means essentially directly to said data terminal unit means.

12. A portable device for tracking and marking packages or the like according to claim 11, further comprising an I/O port means connected to said control means for electrical communication with an external computer.

13. A portable device for tracking and marking packages or the like according to claim 1, further comprising pivot means connected to said printing unit means and said data terminal unit means for angular adjustment of said printer unit means with respect to said data terminal unit means.

14. A portable device for tracking and marking packages or the like according to claim 13, further comprising a biasing means between said printing units means and said data terminal unit means for alignment of said printing unit means in said angular relationship to data terminal unit means.

15. A portable device for tracking and marking packages or the like according to claim 11, further comprising a yoke means connected to said data terminal unit means, said yoke means electrically and mechanically engaging and holding said printing unit means.

16. The portable device of claim 11, wherein the data terminal unit is operable independently of the printing unit means.

17. The portable device of claim 11, in which the printing unit means comprises a hand held printing unit means.

18. The portable device of claim 17, in which the data terminal unit means comprises a hand held data terminal unit means.

19. A portable printer for printing labels or the like, comprising:
means for advancing a printing medium through the printer thermal print head for printing information on the printing medium;
a mechanically adjustable connection means for enabling the printer to be detachably connected directly to a data terminal unit; and
electrical connector means for providing a detachable and direct electrical connection between the printer and a data terminal unit and for transmitting through the electrical connector means printing information for the printer.

20. The printer of claim 19, in which the printer further comprises mechanical adjustment means for providing an adjustable angular orientation between the printer and the data terminal unit, without affecting the operability of the portable device.

21. The printer of claim 20, in which the means for advancing the printing medium include means for advancing a roll of backing sheet containing a plurality of detachable labels adheringly disposed thereon.

* * * * *